Patented Aug. 18, 1931

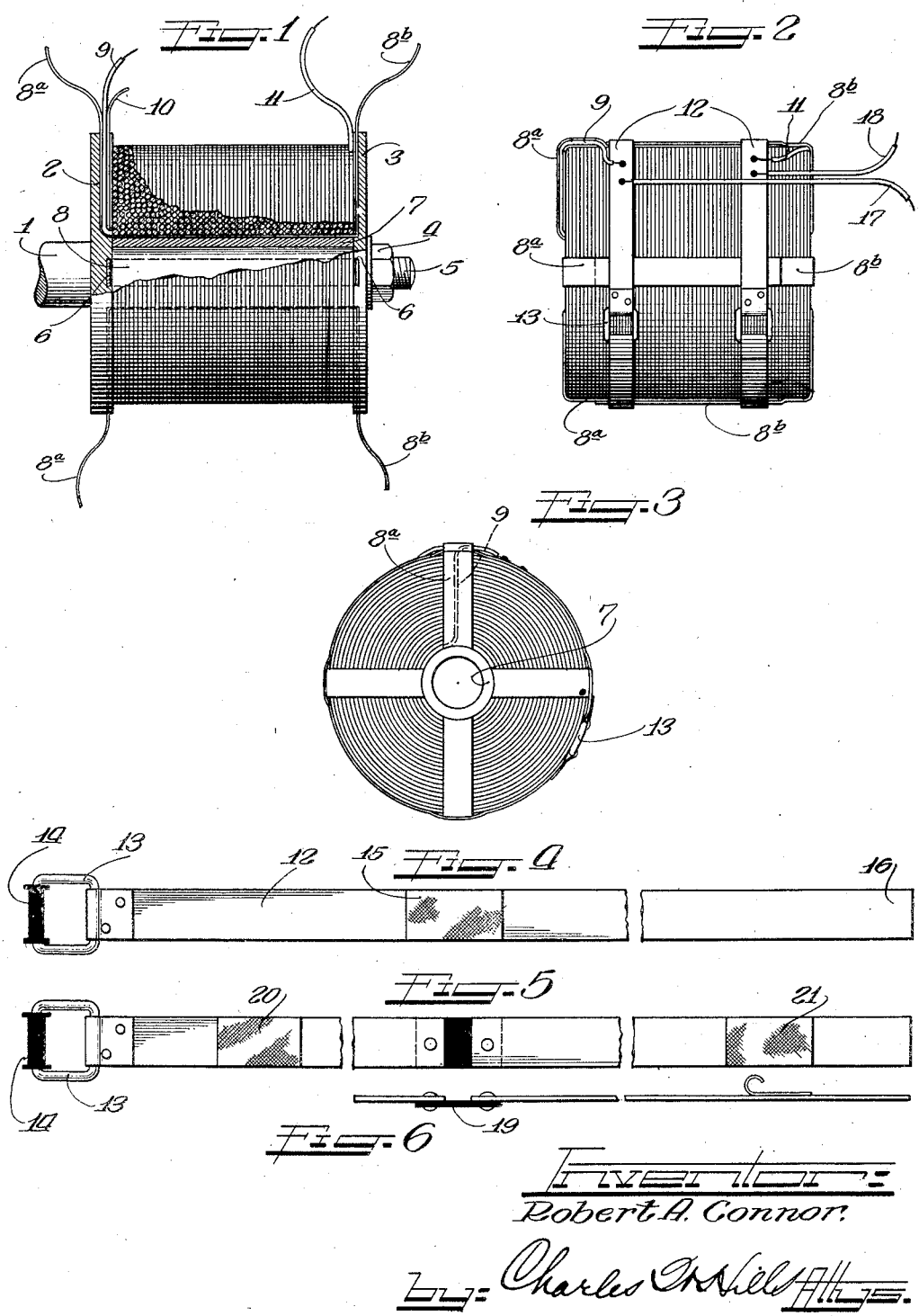

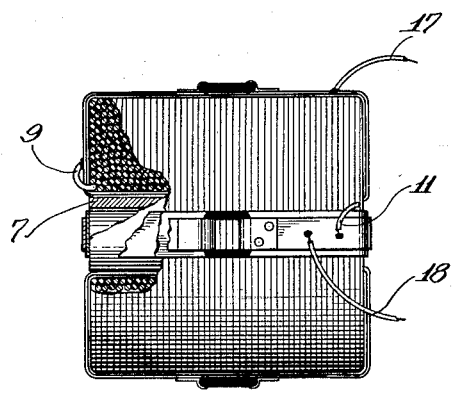
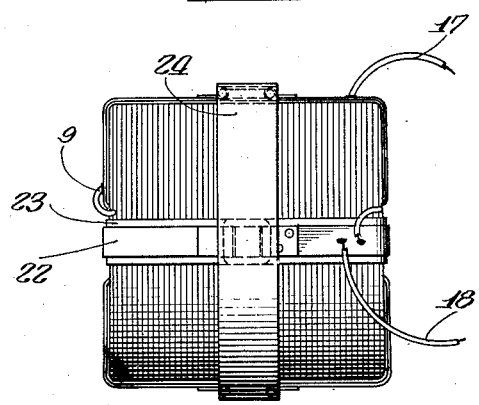
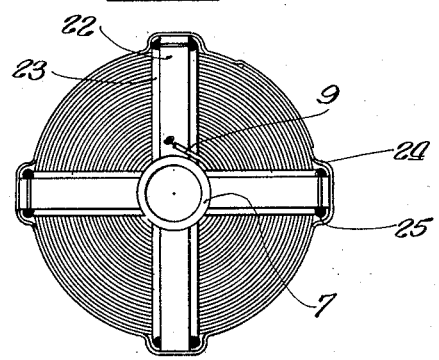
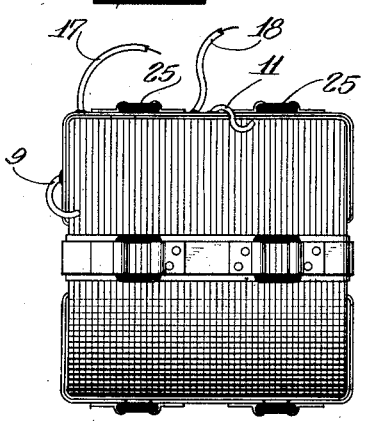
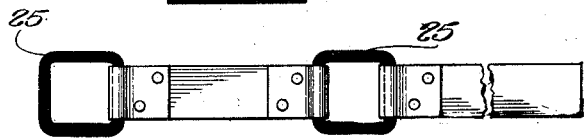

1,819,638

UNITED STATES PATENT OFFICE

ROBERT A. CONNOR, OF FORT WAYNE, INDIANA, ASSIGNOR TO INCA MANUFACTURING CORPORATION, OF FORT WAYNE, INDIANA, A CORPORATION OF INDIANA

MAGNET COIL AND METHOD OF MAKING SAME

Application filed December 16, 1929. Serial No. 414,369.

This invention relates to coils, and more particularly to the winding and construction of magnet coils for use in various electrical devices.

It has heretofore been the practice of wire manufacturers to wind the finished wire upon spools which were shipped to the manufacturer of electrical devices. The latter would then rewind the wire into coils having electrical characteristics consistent with the requirements of the devices with which they were to be used. It is obvious that such a procedure, from a manufacturing viewpoint, is uneconomical, in that the manufacturer of electrical devices must not only pay for the original winding of the wire upon spools, but must also go to the added expense of rewinding the same into coils. This latter expense must necessarily include not only the additional skilled labor required, but also many other items, such as the difficulties arising from slack periods of production, the possibility of damaging the wire during the rewinding process, and the like.

Since the major portion of the coils as required by the electrical device manufacturers may be made to conform to standard specifications, this invention proposes the winding of the coils by the wire manufacturer, in which case it would not be necessary, as heretofore, to wind the wire upon spools. The problems attending this change have been solved by the applicant's invention, which invention embraces a novel method of constructing magnetic coils, which not only permits the finished coil to be shipped to the electrical device manufacturer, but materially decreases the cost of the completed coil.

Many of the manufacturers of electrical devices require, when the coils are furnished by the wire manufacturer, that they be provided with connection leads. This invention, therefore, proposes to so construct the coil and bring out the ends thereof to terminals in such a manner that connection leads may be easily and simply secured thereto or omitted, as desired.

It is, therefore, an object of this invention to provide a coil which may be simply and inexpensively manufactured and shipped to the user as a standard and complete article ready for use.

It is a further object of this invention to provide a novel means for mechanically strengthening the coil, said means providing, in addition, electrical terminals for the coils.

Other and further important objects of this invention will be apparent from the disclosures in the accompanying drawings and the following specification.

The invention, in a preferred form, is illustrated on the drawings and hereinafter more fully described.

On the drawings:

Figure 1 is a view showing a coil embodying the features of this invention as mounted on a mandrel during the winding process, said coil having cut away portions to show the manner of securing the longitudinal straps between the tubular core of the coil and the inner turns of the coil.

Figure 2 is an elevational view of a completed coil showing the circumferential binding straps clamped around the coil and the overlapped ends of the longitudinal straps, and connection leads connected to the circumferential binding straps.

Figure 3 is an elevational view of the end of the coil shown in Figure 2.

Figure 4 is a plan view of one of the circumferential binding straps.

Figure 5 is a plan view showing a modified form of circumferential binding strap.

Figure 6 is a fragmentary elevational view of the circumferential binding strap shown in Figure 5.

Figure 7 is an elevational view of a modified coil construction showing connection leads connected to individual longitudinal straps.

Figure 8 is a view similar to that shown in Figure 7, except that it also shows a circumferential strap around the coil and longitudinal straps.

Figure 9 is an elevational view of the coil shown in Figure 8.

Figure 10 is an elevational view of a coil showing the connection leads connected to one longitudinal strap, said strap having electrically insulated sections.

Figure 11 is a plan view of a longitudinal strap, showing a method for insulating the sections thereof.

As shown on the drawings:

In the illustrated embodiment of this invention, there is shown in Figure 1 a winding mandrel 1 having a flange 2 integrally formed thereon. The outer end of the mandrel carries a removable plate 3 which is secured in place by a nut 4 threaded onto an integrally formed stud 5 projecting from the end of the mandrel shaft. It is to be noted that the circumferential flanges 2 and plate 3 are provided with radial grooves 6 on their confronting surfaces, the purpose of which will be explained subsequently. Also, that one of the radial grooves in the flange 2 is made of greater depth than the other grooves therein, to facilitate bringing out the inner end of the coil. Although four radial grooves are shown in the flange 2 and the plate 3, it is not intended that the invention shall be limited to this specific number. It is contemplated that any number of grooves may be provided as desired.

The procedure in constructing a coil as shown in Figure 2 is as follows:

A tubular core 7 is placed over the mandrel shaft and held thereon by the plate 3 which is forced thereagainst by tightening the nut 4. Plate 3 should be so positioned, relative to flange 2, that each of the radial grooves therein will be in alignment with a radial groove in the flange. Longitudinal straps 8, in this instance formed of a fabric material, are then laid lengthwise the core, the end portions thereof being bent outwardly and inserted into the radial grooves; said straps being of sufficient length to provide projecting ends 8a and 8b.

An electrical conductor is now wound over the tubular core and longitudinal straps thereon, said straps thereby being securely held in place between the inner turns of the coil and the tubular core. The inner end 9 of the coil is brought out through the deeper groove in the flange 2, a protective strip 10 being placed between the coil end and the end turns of the coil. The inner end of this strip may, if desired, extend a short distance into the coil and be securely clamped between the coil turns.

When the desired number of turns have been wound into the coil, the ends 8a and 8b of each longitudinal strap are folded inwardly, overlapped, and glued or otherwise secured, thereby bracing the coil and preventing the turns from becoming loose when the conductor feed is severed. The last turn of the coil terminates in a projecting end which forms the outer end 11 of the coil.

Additional mechanical strength is also provided by means of the circumferential straps 12 which are clamped around the coil and the overlapped ends of the longitudinal straps. The assembled coil is now removed from the mandrel and sprayed, dipped or otherwise impregnated.

Each circumferential strap is formed from a narrow strip of metal, such as copper, and a buckle 13 is secured to one end thereof in any appropriate manner. In the instant case, the buckle has been secured by turning back the end of the strap, inserting one side of the buckle in the fold and either riveting or otherwise securing the turned-back end to the body of the strap. The other side of the buckle is provided with a sleeve 14 of insulating material having an outwardly turned flange on each end. This sleeve prevents the formation of a closed metallic circuit around the coil and thereby eliminates circulating currents in the strap. In spaced relation to this buckle, a fabric or tape patch 15 is glued or otherwise secured to the surface of the strap. The strap is clamped around the coil, as shown in Figure 2, by inserting the end 16 through the buckle, pulling it tightly over the sleeve 14 and bending it back.

Since a coating of the impregnating material will be formed over the entire coil, it is evident that, in order to make terminal connections to the straps, a portion thereof must be free from said impregnating material. By removing the patch 15 from each strap a clean portion is provided to which the ends of the coil are brazed, as shown in Figure 2, and connection leads 17 and 18 soldered, if desired.

A modified circumferential strap is shown in Figure 5, which is adapted primarily for use in the construction of small coils, where it would not be feasible to use two straps as previously described. In this case, the strap is formed much the same as the one shown in Figure 4, except that it is divided into two insulated sections. This may be done in any well known manner. For illustration, however, the strap is shown as being divided by a small strip 19 of insulation to which the adjacent ends of the strap sections are secured in spaced relationship by rivets or any other approved means. In this case, it will also be necessary to provide two tape patches 20 and 21 which are similar to the patch 15 and serve a similar purpose.

Other modified forms of coil structures which are within the contemplation of this invention are illustrated in Figures 8 and 10.

These structures are in general the same as already described, that is, embracing both longitudinal and circumferential straps. In the modified forms, however, it is to be noted that the longitudinal straps 22 are of metal and overlie a strip of insulating fabric 23. Terminal connections may be made to the individual straps as shown in Figure 8 or to insulated sections formed in one of the straps as shown in Figure 10. An added advantage resulting from the use of metal longitudinal straps is that the connection from the inside of the coil can be made very short, thereby decreasing the possibility of damage to the small conductor and also adding mechanical strength thereto. Circumferential straps 24, in this instance of fabric material, may be used to further strengthen the coils, if desired.

Figure 11 shows another form of metal strap having insulated sections the same as the form shown in Figure 5. In the former, the buckle 25 is made of insulating material, thus providing a less expensive strap. The manner of clamping this form of strap around the coil is the same as previously described.

Although the coil structure described herein and the novel means of bracing and providing terminals is particularly applicable to a single section coil, it is also contemplated that the invention may be used in connection with coils having more than one section; taps being brought out to the metal straps.

This invention, therefore, provides a simple and inexpensive method for manufacturing coils which are very strong and durable, and are in this respect particularly adapted for shipping. A novel means is also provided for strengthening the coils by means of circumferential and longitudinal straps, certain of said straps forming the coil terminals.

I am aware that numerous details of construction may be varied through a wide range without departing from the spirit of this invention, and I, therefore, do not purpose limiting the patent granted otherwise than necessitated by the prior art.

I claim as my invention:

1. In a magnet coil, a circumferential strap for bracing said coil, and means including said strap arranged to form coil terminals.

2. In a coil structure, a metal strap around the coil for bracing the same, said strap having electrically insulated sections, and means including said strap whereby the insulated sections form coil terminals.

3. In a coil structure, a metal strap surrounding said coil, a buckle on one end of said strap adapted to receive the other end of the strap, and an interposed member for insulating one end of the strap from said buckle.

4. As an article of manufacture, a coil terminal comprising a metallic strap, a buckle secured to one end of said strap, means for insulating said strap against circulating currents, and a tape patch secured to the surface of said strap.

5. In a coil structure, circumferential binding straps, longitudinal binding straps, and means including certain of said straps, whereby coil terminals are formed.

6. In a coil structure comprising a coil wound on a tubular member, a plurality of straps between the inner turns of said coil and said member, each strap extending around the ends of the coil and overlapping adjacent the outer turns of the coil, a binding member extending around said coil over the overlapped portions of each strap, said member having insulated metallic sections, and means for electrically connecting the coil to said sections.

7. In a coil structure comprising a coil wound on a tubular core, a plurality of fabric members extending transversely the coil turns, a plurality of metallic bands clamped around the circumference of said coil and overlapping said members, means for electrically insulating said band for preventing induced currents therein, and means for connecting the coil to certain of said bands, whereby coil terminals are formed.

8. A method for constructing a magnet coil consisting in placing fabric straps on a tubular core, winding a conductor thereon, folding each strap over the end turns of the coil, overlapping the ends of the strap and securing them together so as to overlie the outer turns of the coil, clamping terminal bands around the coil and overlapping ends of the straps, and brazing a coil connection to each terminal band.

9. A method for constructing a magnet coil consisting in placing fabric straps on a tubular core, winding a conductor thereon, folding each strap over the end turns of the coil, overlapping the ends of the straps and securing them together so as to overlie the outer turns of the coil, clamping terminal bands around the coil and overlapping ends of the straps, brazing a coil connection to each terminal band, and soldering a connection lead to each band adjacent the coil connection.

10. A method for constructing a magnet coil consisting in placing straps longitudinally of a central core, winding a conductor thereon, clamping said strap around said turns, clamping circumferential straps around said coil and former straps, and connecting leads from said coil to certain of said straps.

11. In a coil structure having a tubular core, a metal band extending between said coil and core, means for clamping said band around the turns of said coil, insulating means for sectionalizing said band, and electrical connection from the coil to said band.

12. In a magnet coil, a strap extending longitudinally of said coil for axially bracing the same, and means including said strap arranged to form coil terminals.

13. In a coil structure comprising a coil wound on a tubular member, a plurality of straps between the inner turns of said coil and said member, each strap extending around the end of the coil and overlapping adjacent the outer turns of the coil, a strap extending circumferentially around said coil over the overlapped portions of each of the first mentioned straps, certain of said straps having insulated metallic sections, and means for electrically connecting the coil to said sections.

In testimony whereof I have hereunto subscribed my name at Fort Wayne, Allen County, Indiana.

ROBERT A. CONNOR.